United States Patent [19]
Jones

[11] Patent Number: 6,117,217
[45] Date of Patent: Sep. 12, 2000

[54] AGRICULTURAL LIQUID AMMONIA PUMP-VAPOR STRIPPER

[76] Inventor: James Michael Jones, 413 W. Jefferson, Waxachie, Tex. 75165

[21] Appl. No.: 09/291,568

[22] Filed: Apr. 14, 1999

[51] Int. Cl.[7] .................................................. B01D 19/00
[52] U.S. Cl. .............................. 96/165; 96/167; 96/214; 96/217
[58] Field of Search .......................... 95/248, 254, 261; 96/167, 165, 196, 214, 217

[56] References Cited

U.S. PATENT DOCUMENTS

| | | | |
|---|---|---|---|
| 2,763,336 | 9/1956 | Erikson | 95/261 |
| 2,952,329 | 9/1960 | Cunningham et al. | 96/217 |
| 3,277,632 | 10/1966 | Halberg et al. | 96/165 |
| 3,961,918 | 6/1976 | Johnson | 96/165 |
| 3,978,681 | 9/1976 | Kjelgaard et al. | 95/254 |
| 4,175,394 | 11/1979 | Wiesboeck | 95/254 |
| 4,516,987 | 5/1985 | Niggemann | 95/261 |
| 4,997,463 | 3/1991 | Ricciardelli | 96/165 |
| 5,019,141 | 5/1991 | Granville et al. | 96/165 |

*Primary Examiner*—Duane S. Smith
*Attorney, Agent, or Firm*—Jenkens & Gilchrist, A Professional Corporation

[57] ABSTRACT

A liquid ammonia pump-vapor stripper unit is disclosed having an impeller pump assembly which increases the system pressure before it is delivered to a receiver-accumulator where the ammonia vapor mass formed along its path from the storage tank is separated from the liquid and throttled across a variable area regulator formed between a regulator cone and a regulator ball and past a normally closed demand valve before the vapor mass is returned to the storage tank. The dew point of the liquid ammonia mass flowing through the unit is increased by the impeller pump due to the additional pressure added to the system, the liquid ammonia leaving the receiver-accumulator behaves more like a true liquid resulting in a more accurate downstream metering and a more efficient delivery of ammonia to the soil.

9 Claims, 4 Drawing Sheets

AGRICULTURAL LIQUID AMMONIA PUMP-VAPOR STRIPPER

BACKGROUND

The present invention relates to both the mechanical and the electronic ammonia fertilizer application systems for agricultural use.

The typical electronically controlled ammonia application systems consist of a nurse tank trailed behind a tool bar which is attached to a tractor. A computer console is mounted accessible to the tractor operator.

The nurse tank is a pressure vessel which contains the ammonia in its liquid state. The liquid withdrawal valve is mounted at the top of the tank and has a dip tube which extends to the bottom of the tank. A suitable hose connects this valve to a filter connected to a main shutoff valve mounted on the tool bar. The ammonia then flows through a heat exchanger unit, then through a turbine or venturi meter, then to an electronically controlled throttling valve, then to one or more manifolds, and finally through suitable hoses to the applicator knives which inject the ammonia into the soil.

The typical mechanical systems are about the same as the electronic systems, however they utilize manually adjustable mechanical meters downstream of a heat exchanger unit.

As the liquid ammonia enters the dip tube located at the bottom of the tank, its thermodynamic conditions begin to change. The ammonia begins to expand. This results in the formation of ammonia vapor within the system which must be removed by a heat exchanger unit prior to metering in order to assure a proper quantity of ammonia to the applicator knives. The swath width of the tool bar and the desired amount of ammonia per acre are entered into the computer. The computer receives signals from either a turbine or venturi type meter and from the ground speed sensor. The computer processes the data and compensates for any variations by electronically controlling the throttling valve.

These systems work fairly well, but under certain conditions problems can arise. They lose all control of the ammonia as soon as it crosses the throttling valve. In cooler weather the pressure difference across the system is reduced and sagging hoses can cause the formation of plugs of liquid ammonia which result in uneven distribution to the applicator knives. Crops such as corn require more than twice the amount of ammonia per acre than the smaller grain crops. The greater expansion of the ammonia across the total system often forms more vapor than the typical heat exchanger unit can handle.

The most efficient source of nitrogen is anhydrous ammonia, which is stored within tanks as a liquefied gas. The vapor pressure contained within the upper portion of the tank moves the liquid ammonia to the withdrawal valve. The liquid ammonia stored within the tank contains potential energy in the form of heat which is used to move the ammonia after the vapor pressure in the tank has accelerated the liquid to the withdrawal valve. As the liquid crosses the high resistance at the withdrawal valve, there is a drop in pressure and temperature, which requires potential energy from the liquid. This energy produces ammonia vapor, requiring more volume for the mass which moves the product through the system. This results in a continual reduction in the mean product density which greatly hampers its management and metering. The ultimate result is an insufficient application of ammonia to the field and a reduction in crop yield, The large food producers of the world with its increasing population can no longer afford the present inefficient anhydrous ammonia management systems. The proper management of the ammonia requires it to be in its liquid state as it crosses its metering devices, and means to provide compensation for the changes in liquid density for the electronic systems.

An ideal liquid ammonia temperature for proper metering would be 28 F. degrees with its liquid density at about 40 lbs/cubic foot. The only sensible method to achieve this is to maintain the pressure upon the liquid in the system by returning the vapor under pressure to the tank. The sun provides the energy to maintain the vapor pressure within the tank that moves the liquid to the withdrawal valve. When 100 lbs of liquid ammonia at 28 F. degrees leaves the tank, there is a resulting loss of 2.5 cubic feet of space within the tank which must be replaced by either the evaporation of 0.498 lbs of liquid ammonia or by the returning of the stripped vapor from downstream to the tank. This vapor has only kinetic energy, while the liquid in the tank has only potential energy until it is accelerated.

It would be a distinct advantage to have an ammonia control device which would provide the means necessary to reduce the volume of the ammonia within the system to a state of total liquid, which would provide for greater control, and application accuracy. The present invention provides such a unit.

SUMMARY

In one embodiment, the invention is embodied in a vapor stripper assembly for removing vapor from a flow of mass, the vapor stripper assembly generally including a receiver body and a vapor stripper. The receiver body has a receiver chamber with a receiver mass inlet for receiving the flow mass, a receiver liquid outlet, and a receiver vapor outlet, the vapor stripper includes a variable area inverted regulator cone and a regulator ball. The variable area inverted regulator cone is in fluid communication with the receiver vapor outlet of the receiver body, and has a regulator cone vapor outlet. The regulator ball is positioned to operate within the variable area inverted regulator cone such that the area around the regulator ball in the variable area inverted cone decreases as the regulator ball becomes in closer proximity to the regulator cone vapor outlet.

In a further embodiment, the receiver liquid outlet of the receiver body has a liquid outlet flow direction that is substantially parallel to the mass inlet flow direction of the receiver mass inlet, and the receiver vapor outlet has a vapor outlet flow direction that is above and substantially perpendicular to the receiver mass inlet flow direction. In yet a further embodiment, the receiver body further includes a transition wall in the receiver chamber that slopes upwardly from the receiver liquid outlet to the receiver vapor outlet.

In another further embodiment, the vapor stripper assembly further includes a demand valve in fluid communication with the regulator cone vapor outlet and having a stripper vapor outlet, the demand valve restricting flow from the regulator cone outlet to the stripper vapor outlet until a predetermined flow mass is supplied to the receiver mass inlet. In yet a further embodiment, the demand valve comprises a valve seal plate, a back seating vapor demand valve stem, a demand valve body, a diaphragm plunger assembly, and a spring. The valve seal plate is disposed between the regulator cone vapor outlet and the stripper vapor outlet, and has a valve opening therebetween. The back seating vapor demand valve stem has a valve face disposed for engagement with the valve opening of the valve seal plate. The demand valve body has a first chamber for receiving pressure from the flow mass supplied to the receiver mass inlet of the receiver body, and a second chamber in fluid communication with ambient air. The diaphragm plunger has a diaphragm separating the first chamber from the second chamber in the demand valve body, and a plunger positioned to move the valve face of the vapor demand valve stem away from the valve opening in the valve seal plate as the diaphragm is forced away from the first chamber of the demand valve body to the second chamber. The spring is positioned to urge the valve face of the backseat vapor demand valve stem towards engagement with the valve opening of the valve seal plate.

In another further embodiment, a filter is positioned such that fluid passing from the receiver vapor outlet of the receiver body to the vapor stripper passes through the filter before entering the vapor stripper.

In another further embodiment, the vapor stripper assembly includes a pump connected for supplying the flow mass to the receiver mass inlet of the receiver body. In yet a further embodiment, the vapor stripper includes the demand valve, and the demand valve restricts flow from the regulator cone outlet to the stripper vapor outlet until the demand valve receive a predetermined pressure head supplied from a pitot tube disposed within an outlet of the pump.

DETAILED DESCRIPTION

Figure 1:
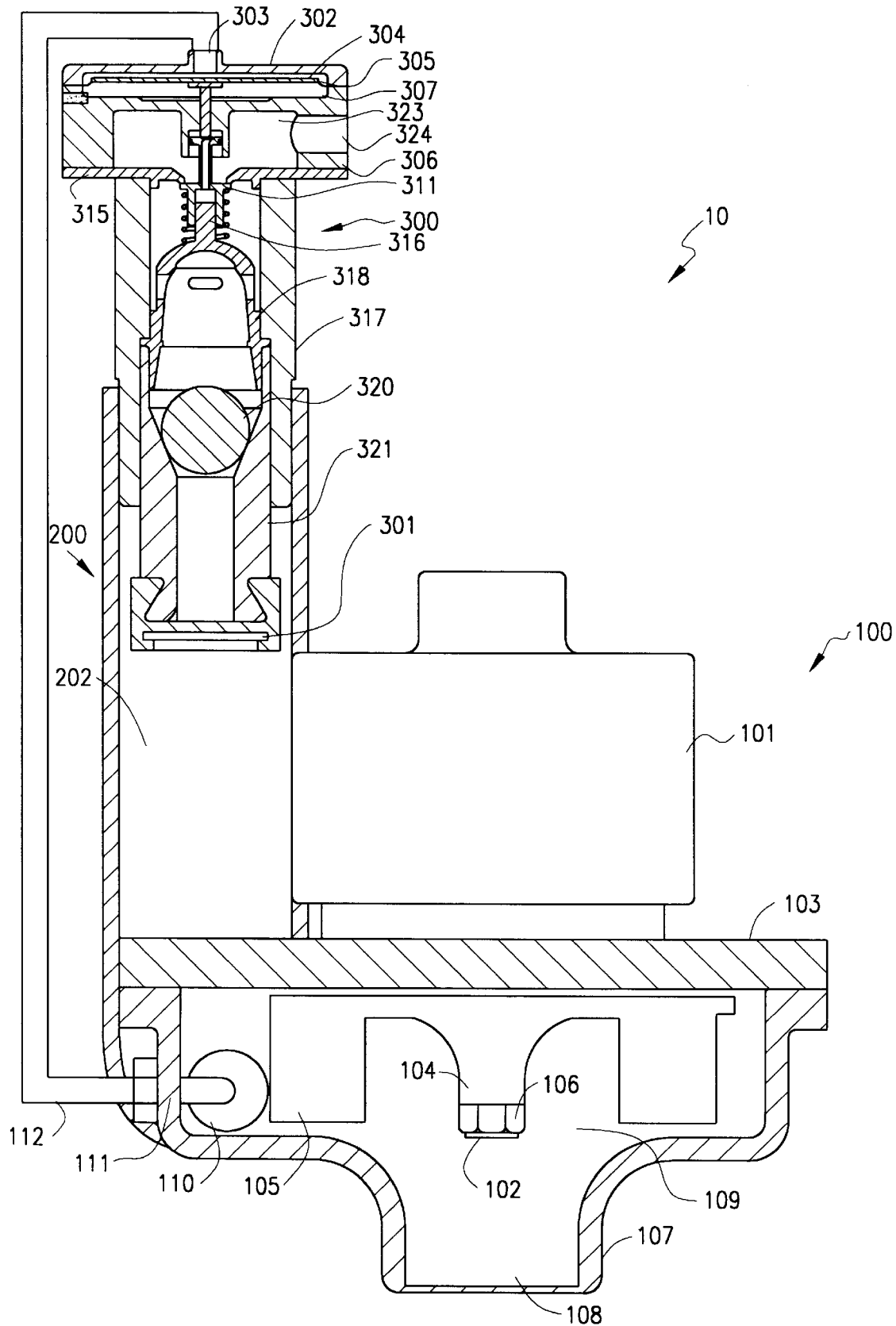
FIG. 1 is a partial cross sectional illustrating a preferred embodiment of the present invention.

The present invention relates to the copending application filed by the same inventor, James Michael Jones, on the same day herewith, entitled "Agricultural Amonia Tool Bar Throttle Valve" with the attorney docket number of 27858-00010, which is hereby incorporated herein in its entirety by specific reference hereto.

The art of this invention is the art of providing a liquid ammonia at a greater dew point than as indicated by the temperature of the system to one or more throttling valves where the metering occurs just prior to the ammonia exiting the system to one or more applicator knives. This is accomplished by the means of a centrifugal impeller pump which increases the system pressure, which is also used to return the stripped ammonia vapor to the tank, and also assures the delivery of liquid ammonia to the downstream meters and throttling devices.

In an embodiment of the present invention, a liquid ammonia pump is comprised of a power source which drives an impeller housed within a circular chamber which receives the liquid ammonia along with the vapor formed along its path from the tank withdrawal valve. The impeller is offset within the circular chamber, which has an outlet at about 90 degrees off of a line through the center of the impeller and the centerline of the circular chamber. This arrangement allows a continual circular movement of ammonia along the inter wall of the circular chamber. In operation, the velocity of the ammonia will equal that of the impeller. (The impeller can be operating with no liquid ammonia in the unit.) Since the impeller has its own velocity, it will also have a fluid head which can be expressed in PSI. Should the impeller motor have a constant speed of 2400 RPM, the liquid in the circular path will have a velocity equal to the periphery speed of the impeller multiplied by the ratio of its accelerating vane, which would be about 125 feet per second. At a liquid density of 40 lbs/cubic foot, the impeller would increase the inlet pressure by approximately 65 PSI at the outlet as the kinetic energy of the ammonia returns to potential. When there is little or no downstream demand for the ammonia, the ammonia within the impeller chamber simply rides with the impeller, it has both kinetic and potential energy and the only load upon the pump is its friction.

The stream of ammonia, both vapor and liquid, then enters an inlet of the receiver\accumulator unit. The liquid ammonia outlet of the receiver\accumulator is approximately in line with the inlet. The upper wall of the receiver\accumulator slopes upward to the vapor outlet. The vapor outlet of the receiver-accumulator is rather large and is several inches above and at 90 degrees from the center line of the liquid outlet. The vapor outlet of the receiver\accumulator receives the inlet of a vapor stripper valve which also has a demand regulator valve which is opened during operation by the fluid velocity head of the impeller pump. The regulator reads the pressure difference between the head of the impeller pump and the terminal velocity of a fairly large steel ball, which is a constant. The vapor is throttled by the mass of the ball which is constantly repositioning itself within an inverted cone. As the ball rises, the open area is decreased, as the ball sinks, the open area increases. Should the vapor moving upwards across the ball become damp, the ball will rise, thereby reducing the vapor output which requires more receiver volume for the vapor, which in turn reduces the liquid level in the receiver. Whenever the ball is forced completely upward to the top, the ammonia vapor moving in the unit cannot support the weight of the ball and neither can the vapor pressure across the discharge port, so the ball will begin to sink again, releasing more vapor. The liquid within the receiver will begin to rise again.

The vapor is being continually throttled by the changing open area across the ball. There is also a back seating vapor demand valve downstream from the ball which is opened by the velocity head of the liquid in motion.

The vapor returning to the tank will be whatever is formed from the liquid ammonia as it is accelerated from the tank withdrawal valve to the stripper valve. This vapor mass is always in excess of the vapor required to fill the void created by the withdrawal of liquid from the tank. The main function of vapor stripping is to return heat to the tank.

The stripped vapor can be considered as 1.75% of the total ammonia mass, with an approximate maximum output of 15,180 lbs of ammonia per hour. At a liquid temperature of 28 F. degrees, the liquid density is 40 lbs/cubic ft. while the vapor density is 0.1992 lbs/cubic ft. At the maximum output there will be a total of 1333.58 cubic ft (265.65 lbs) of vapor per hour versus 372.86 cubic ft (14,914.35 lbs) of liquid per hour.

The results provided by this device are best described by the following chart:

| Amb. Dew Point | Vapor PSI | Outlet Liquid PSI | Outlet Dew Point | Temp. Diff. | BTU |
| --- | --- | --- | --- | --- | --- |
| 28F | 42.6 | 107.6 | 67F | 39F | 42.51 |
| 35F | 51.6 | 116.6 | 71F | 43F | 46.9 |
| 45F | 66.3 | 131.3 | 77F | 49F | 53.4 |
| 60F | 92.0 | 157.0 | 87F | 59F | 64.3 |
| 80F | 138.3 | 203.3 | 102F | 74F | 80.7 |
| 100F | 197.2 | 262.2 | 117.5F | 89.5F | 97.56 |

The listed BTU is the heat required per lbs of liquid before vapor is formed, so at 100 F. degrees at the maximum flow of 15180 lbs/hr, the total BTU required for vapor formation would be 1480960.8 BTU.

This signifies that the stripper does not need to be 100% efficient. The additional system pressure provided by the impeller pump will condense a large amount of vapor by absorbing its latent heat by increasing the liquid temperature.

Referring now to the figures, and more particularly to FIG. 1, there is shown a partial cross sectional view of a liquid ammonia pump/vapor stripper assembly, indicated generally at 10, illustrating an embodiment of the present invention. The assembly unit 10 generally comprises an impeller pump assembly 100, an ammonia receiver-accumulator body 200, and a vapor stripper-throttling assembly 300.

Figure 2:
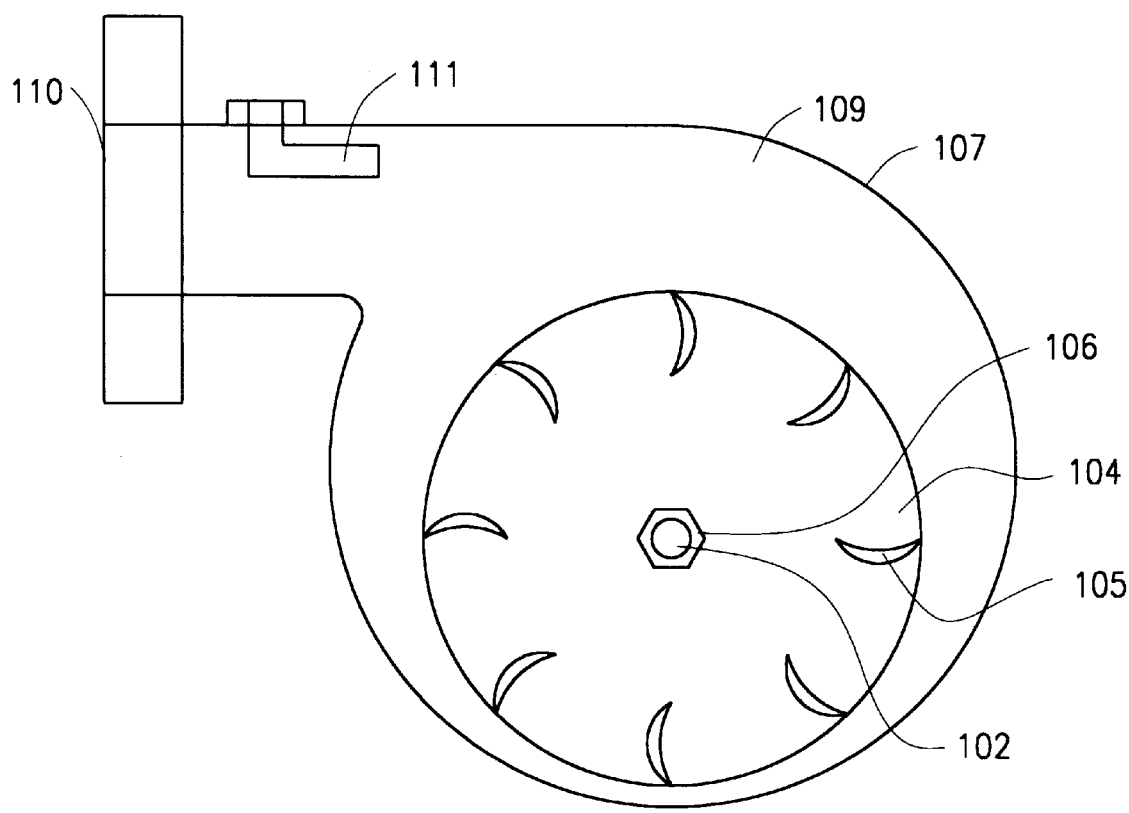
FIG. 2 is a line drawing illustrating an internal view of an impeller pump assembly.

The impeller pump assembly 100, as shown in FIGS. 1 and 2, generally includes a power source 101, a top cover 103, an impeller 104, and a lower impeller body 107. The power source 101, which could be a DC motor or a small internal combustion engine, has an output shaft 102 which extends through the top cover 103. The impeller 104 has curved vanes 105 and is attached to the shaft 102 by a lock nut 106. The curved vanes 105 act to increase the ammonia velocity. The lower impeller body 107 also includes an ammonia inlet 108 which feeds a circular chamber 109. As illustrated in FIG. 2, the impeller 104, with the curved vanes 105, is positioned off-center within the circular chamber 109. An impeller pump outlet 110 is positioned in the wall of the circular chamber 109 in the lower impeller body 107. An ammonia pressure pitot tube 111 is positioned in the impeller pump outlet 110.

In operation, the curved vanes 105 accelerate the ammonia outward along the same path and at the same speed at which the impeller 104 rotates, and provides a continual movement of ammonia around the outer wall of the circular chamber 109. The ammonia mass leaves the chamber 109 across the outlet 110 in the lower impeller body 107. The ammonia mass exiting the outlet 110 enters the receiver-accumulator body 200. The pressure from the pitot tube 111 is provided to the vapor stripper-throttling assembly 300 through a suitable conduit 112.

Figure 3:
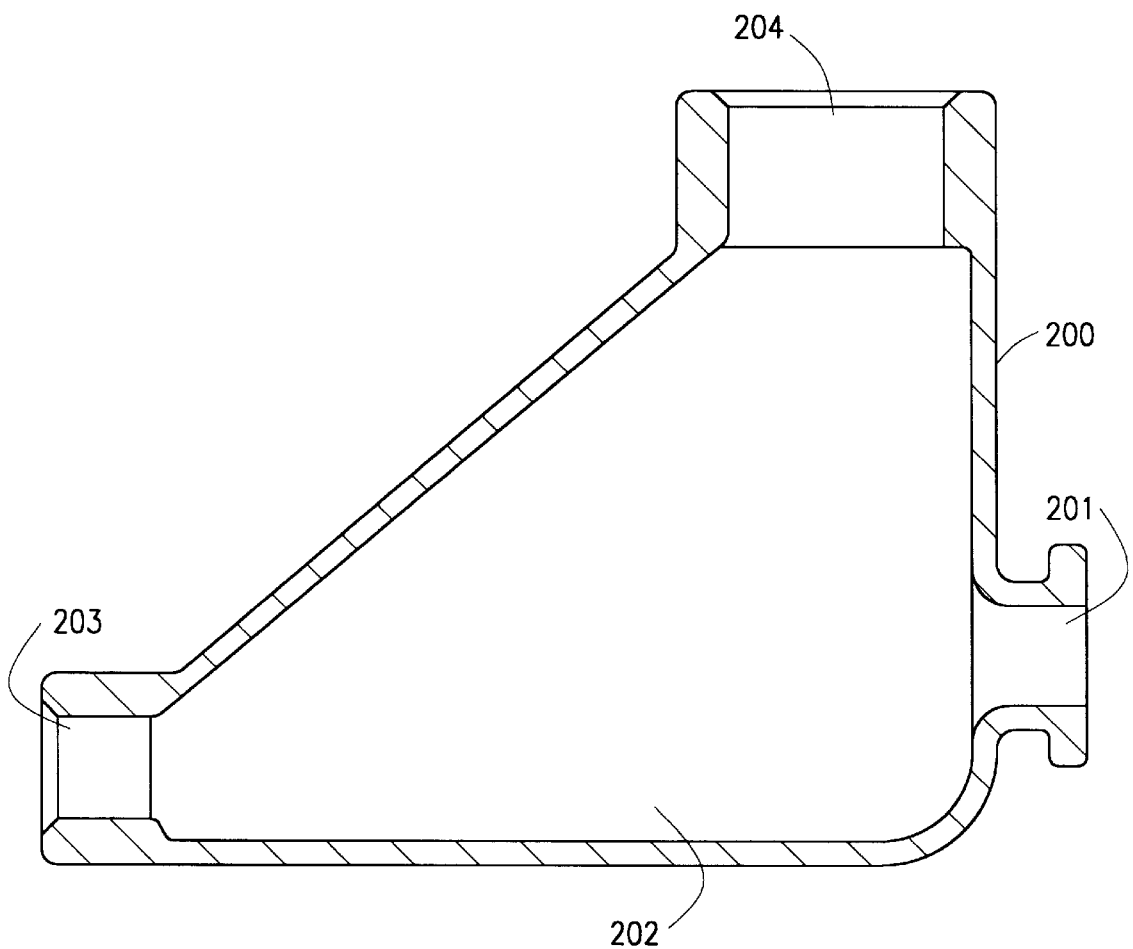
FIG. 3 is a cross sectional illustrating an ammonia receiver-accumulator.

The receiver-accumulator body 200, as shown in FIGS. 1 and 3, generally includes a receiver inlet 201, a receiver chamber 202, a receiver liquid outlet 203, and a receiver vapor outlet 204. The ammonia mass from the impeller pump assembly 100 enters the ammonia receiver-accumulator body 200 across the receiver inlet 201 into the receiver chamber 202. The receiver chamber 202 of the receiver-accumulator body 200 has a shape that encourages the ammonia vapor to flow in an upward path towards the receiver vapor outlet 204, while the liquid ammonia at the bottom exits the unit across the receiver liquid outlet 203.

Liquid ammonia from the receiver liquid outlet 203 progresses downstream to system throttle or throttles. The downstream system throttle or throttles, which are not a part of the present invention, determine the amount of ammonia mass moving through the liquid ammonia pump/vapor stripper assembly 10. The ammonia vapor within chamber 202 passes through the receiver vapor outlet 204 of the ammonia receiver-accumulator body 200 to the vapor-stripper throttling assembly 300.

Figure 4:
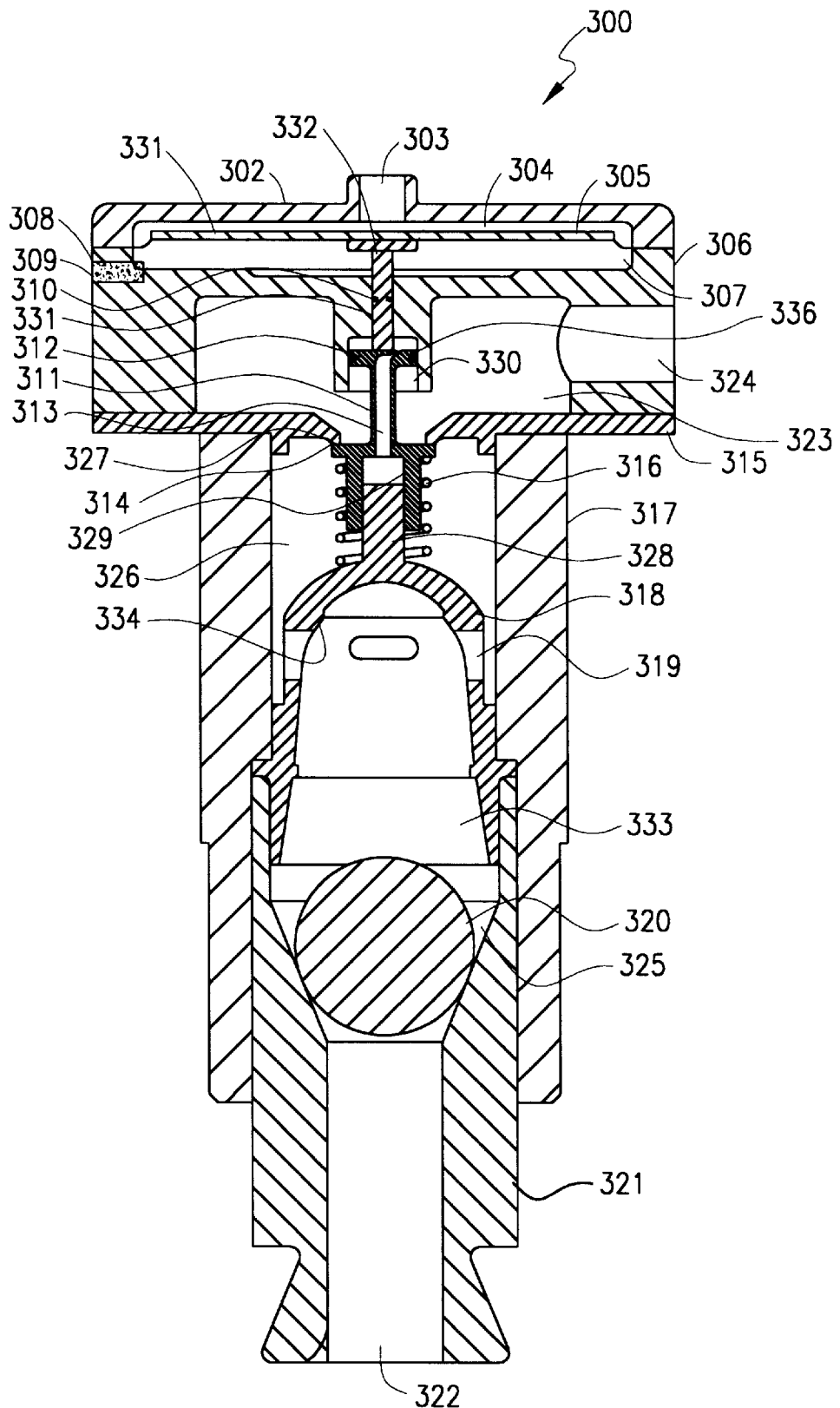
FIG. 4 is a cross sectional illustrating a vapor stripper-throttling valve of a preferred embodiment of the present invention.

The vapor stripping-throttling assembly 300, as shown in FIGS. 1 and 4, generally comprises a vapor inlet barrel 321, a regulator ball 320, a variable area inverted regulator cone 318, a barrel housing 317, a valve seal plate 315, a back seating vapor demand valve 311, a middle body 306, a diaphragm assembly 305, and a diaphragm cover 302.

The vapor inlet barrel 321 includes a barrel inlet 322 connected to a tapered barrel bore 325. A vapor filter 301 covers the barrel inlet 322. The variable area inverted regulator cone 318 includes a regulator open section 333 that transitions to a regulator ball seat 334. The regulator open section 333 is positioned facing the tapered barrel bore 325 of the vapor inlet barrel 321, and the regulator ball 320 is positioned therebetween. Vapor ports 319 in the regulator ball seat 334 communicate with a barrel inlet chamber 326 in the barrel housing 317. The valve seal plate 315 encloses the barrel inlet chamber 326 in the barrel housing 317.

The middle body 306 is disposed on the opposite side of the valve seal plate 315 from the barrel housing 317. The middle body 306 includes a middle body chamber 323 enclosed by the valve seal plate 315. The valve seal plate 315 includes a valve opening 327 between the barrel inlet chamber 326 and the middle body chamber 323. A back seating vapor demand valve 311 controls flow through the valve opening 327 in the valve seal plate 315. Vapor in the middle body chamber 323 exits the middle body 306 and the vapor stripper-throttling assembly 300 through a middle body outlet 324.

The back seating vapor demand valve 311 includes a valve guide bore 329 that engages a valve post 328 on the variable area inverted regulator cone 318. A closing spring 316 disposed between the variable area inverted regulator cone 318 and the back seating vapor demand valve 311 urges a valve face 314 on the back seating vapor demand valve 311 to engage the valve seal plate 315 and close the valve opening 327.

The back seating vapor demand valve 311 also includes a valve piston 336 disposed within a valve piston bore 330 in the middle body 306. The valve piston 336 has a piston seal 312 disposed thereon for sealing and engagement with the valve piston bore 330. A valve vent 313 in the back seating vapor demand valve 311 communicates between the valve guide bore 329 and the valve piston bore 330.

The middle body 306 also includes a lower chamber 307 which is enclosed by a diaphragm 331 of the diaphragm assembly 305. A plunger 332 of the diaphragm assembly 305 passes through a diaphragm plunger bore 331 in the middle body 306 to come in contact with the valve piston 336. A plunger seal 310 in the plunger 332 engages the diaphragm plunger bore 331. The lower chamber 307 is in communication with the ambient air through a middle body vent 308 having a filter 309 therein.

The diaphragm cover 302 is disposed over the diaphragm 331 of the diaphragm assembly 305. The diaphragm 331 encloses an upper chamber 304 in the diaphragm cover 302. The conduit 112 from the impeller assembly 100 is in communication with the upper diaphragm chamber 304 through a diaphragm cover inlet 303.

In operation, the conduit 112 feeds the fluid head pressure generated by the impeller 104 across the inlet 303 of the diaphragm cover 302 and into the upper chamber 304. The lower chamber 307 is vented to the atmosphere across the vent 308 and the filter 309. The seal 310 of the diaphragm plunger assembly 305 prevents the escape of ammonia to the atmosphere through the chamber 307 and the vent 308. The plunger 332 of the diaphragm plunger assembly 305 rests upon the valve piston 336 of the back seating vapor demand valve 311. At rest, the valve face 314 of the back seating vapor demand valve 311 is forced upward against a valve seating plate 315 by the force of the closing spring 316. In operation, the fluid head pressure acting upon the diaphragm assembly 305 in the upper chamber 304 overcomes the force of the closing spring 316 allowing a downward movement of the diaphragm plunger assembly 305, which opens the valve face 314 of the back seating vapor demand valve 311 from the valve opening 327 in the valve seal plate 315.

The pressure of the ammonia vapor in the barrel inlet 322 causes an initial upward movement of the regulator ball 320 towards the regulator cone 318 to unseat the regulator ball 320 from the tapered barrel bore 322 of the vapor inlet barrel 321. The ammonia vapor then passes around the regulator ball 320 and through the vapor ports 319 in the variable area inverted regulator cone 318 into the Barrel inlet chamber 326 of the barrel housing 317. Ammonia vapor in the barrel inlet chamber 326 passes the back seating vapor demand valve 311, through the valve opening 327 in the valve seal plate 315 into the middle body chamber 323 in the middle body 306, and exits the middle body chamber 323 through the middle body outlet 324 for return to the supply tank.

After the initial movement of the regulator ball 320, the pressure difference across the regulator ball 320 will continually reposition the regulator ball 320 within the regulator cone 318. A rising regulator ball 320 reduces the open area between itself and the regulator cone 318, while a sinking regulator ball 320 increases the open area. The rising and the sinking of the regulator ball 320 are determined by conditions which effect the mass of the vapor moving across it. Should the regulator ball become damp, indicating an increase in the ammonia density, the change in the vapor mass results in an upward movement of the ball 320 to support the pressure difference which reduces the vapor flow. A downstream pressure resistance upon the throttled vapor indicates a decrease in the vapor density which causes a downward movement of the ball 320. The ball 320 continually repositions itself to maintain the vapor velocity across itself in order to maintain its own terminal velocity within the regulator cone 318.

In summary, as a unit the liquid ammonia pump-vapor stripper unit 10 of FIG. 1 raises the dew point of the liquid ammonia so that it behaves more like a true liquid and results in a more accurate delivery of ammonia to the soil. It accomplishes this by increasing the pressure within the system and by returning the mass of ammonia vapor formed between the withdrawal valve of the storage tank and the receiver-accumulator 200 to the vapor section of the storage tank.

What is claimed is:

1. A vapor stripper assembly for removing a vapor from a flow mass of the vapor combined with a liquid, comprising:

a receiver body having a receiver chamber with a receiver mass inlet for receiving the flow mass, a receiver liquid outlet, and a receiver vapor outlet;

a vapor stripper including a variable area inverted regulator cone in fluid communication with the receiver vapor outlet of said receiver body, the variable area inverted outlet having a regulator cone vapor outlet, and a regulator ball positioned to operate within the variable area inverted regulator cone; and wherein the area around the regulator ball in the variable area inverted cone decreases as the regulator ball becomes in closer proximity to the regulator cone vapor outlet.

2. The vapor stripper assembly according to claim 1, wherein the receiver liquid outlet of said receiver body has a liquid outlet flow direction that is substantially parallel to a mass inlet flow direction of the receiver mass inlet, and the receiver vapor outlet has a vapor outlet flow direction that is above and substantially perpendicular to the receiver mass inlet flow direction.

3. The vapor stripper assembly according to claim 2, wherein said receiver body further includes a transition wall in the receiver chamber that slopes upwardly from the receiver liquid outlet to the receiver vapor outlet.

4. The vapor stripper assembly according to claim 1, further including a demand valve in fluid communication with the regulator cone vapor outlet and having a stripper vapor outlet, wherein said demand valve restricts flow from the regulator cone outlet to the stripper vapor outlet until a predetermined flow mass is supplied to the receiver mass inlet of said receiver body.

5. The vapor stripper assembly according to claim 4, wherein said demand valve comprises:

a valve seal plate disposed between the regulator cone vapor outlet and the stripper vapor outlet, and having a valve opening therebetween;

a back seating vapor demand valve stem having a valve face disposed for engagement with the valve opening of the valve seal plate;

a demand valve body having a first chamber and a second chamber, the first chamber for receiving pressure from the flow mass supplied to the receiver mass inlet of said receiver body, and the second chamber in fluid communication with ambient air;

a diaphragm plunger assembly having a diaphragm separating the first chamber from the second chamber of the demand valve body, and a plunger positioned to move the valve face of the back vapor demand valve stem away from the valve opening in the valve seal plate as the diaphragm is forced away from the first chamber of the demand valve body to the second chamber; and a spring positioned to urge the valve face of the back seating vapor demand valve stem towards engagement with the valve opening of the valve seal plate.

6. The vapor stripper assembly according to claim 1, further including a filter positioned such that fluid passing from the receiver vapor outlet of said receiver body to the variable area inverted regulator cone passes through said filter before entering the variable area inverted regulator cone.

7. The vapor stripper assembly according to claim 1, further including a pump connected for supplying the flow mass to the receiver mass inlet of said receiver body.

8. The vapor stripper assembly according to claim 7, further including a demand valve in fluid communication with the regulator cone vapor outlet and having a stripper vapor outlet, a pitot tube disposed within an outlet of said pump for receiving the head pressure of the mass flow therefrom, wherein said demand valve receives the head pressure of the mass flow from said pitot tube and restricts flow from the regulator cone outlet to the stripper vapor outlet until a predetermined head pressure is supplied to said demand valve from said pitot tube.

9. The vapor stripper assembly according to claim 8, wherein said demand valve comprises:

- a valve seal plate disposed between the regulator cone vapor outlet and the stripper vapor outlet, and having a valve opening therebetween;
- a back seating vapor demand valve stem having a valve face disposed for engagement with the valve opening of the valve seal plate;
- a demand valve body having a first chamber and a second chamber, the first chamber for receiving the head pressure from said pitot tube, and the second chamber in fluid communication with ambient air;
- a diaphragm plunger assembly having a diaphragm separating the first chamber from the second chamber of the demand valve body, and a plunger positioned to move the valve face of the back vapor demand valve stem away from the valve opening in the valve seal plate as the diaphragm is forced away from the first chamber of the demand valve body to the second chamber; and
- a spring positioned to urge the valve face of the back seating vapor demand valve stem towards engagement with the valve opening of the valve seal plate.

* * * * *